(12) United States Patent
Wawrowski et al.

(10) Patent No.: US 12,477,456 B2
(45) Date of Patent: Nov. 18, 2025

(54) MOBILITY AND COLLABORATION BETWEEN ULTRAPORTABLE SYSTEMS

(71) Applicant: MOTOROLA SOLUTIONS, INC., Chicago, IL (US)

(72) Inventors: Mariusz Wawrowski, Wawrzenczyce (PL); Robert Mrowiec, Liszki (PL); Robert Orzechowski, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 352 days.

(21) Appl. No.: 18/245,935

(22) PCT Filed: Oct. 2, 2020

(86) PCT No.: PCT/PL2020/050073
§ 371 (c)(1),
(2) Date: Mar. 20, 2023

(87) PCT Pub. No.: WO2022/071816
PCT Pub. Date: Apr. 7, 2022

(65) Prior Publication Data
US 2023/0388918 A1    Nov. 30, 2023

(51) Int. Cl.
*H04W 48/20* (2009.01)
*H04W 36/22* (2009.01)
*H04W 48/06* (2009.01)

(52) U.S. Cl.
CPC ........... *H04W 48/20* (2013.01); *H04W 36/22* (2013.01); *H04W 48/06* (2013.01)

(58) Field of Classification Search
CPC ..... H04W 48/20; H04W 36/22; H04W 48/06; H04W 4/90; H04W 24/02; H04W 84/047
(Continued)

(56) References Cited

U.S. PATENT DOCUMENTS 6,963,745 B2   11/2005   Singh et al.
8,023,465 B2    9/2011   Prehofer
(Continued)

FOREIGN PATENT DOCUMENTS

EP     3643112 A1    4/2020
WO  2005025253 A1    3/2005

OTHER PUBLICATIONS

Alexandris, et al., "Analyzing X2 Handover in LTE/LTE-A," IEEE, 2016 (7 pages).
(Continued)

*Primary Examiner* — Michael Y Mapa
(74) *Attorney, Agent, or Firm* — Michael Best & Friedrich LLP

(57) ABSTRACT

One embodiment provides a method for mobility and collaboration between ultraportable systems. The method includes connecting a plurality of portable communications devices (120) to a first base station (110A) and receiving an indication from a first portable communications device (120A) of the plurality of portable communications devices (120) that the first portable communications device (120 A) is in a coverage area (130B) of a second base station (110B). The method also includes determining a number of portable communications devices (120) connected to the first base station (110A) and determining that the number of portable communications devices (120) connected to the first base station (110A) exceeds a capacity threshold of the first base station (110A). The method further includes instructing the first portable communications device (120) to re-attach to the second base station (110B) in response to determining that the number of portable communications devices (120) exceeds the capacity threshold.

17 Claims, 6 Drawing Sheets

(58) Field of Classification Search
USPC .................................. 455/434–444; 370/331
See application file for complete search history.

(56) References Cited

U.S. PATENT DOCUMENTS

| | | | |
|---|---|---|---|
| 8,559,298 B2 | 10/2013 | Catovic et al. | |
| 9,414,286 B1* | 8/2016 | Oroskar | H04W 36/00835 |
| 2013/0315207 A1* | 11/2013 | Andre-Jonsson | H04W 76/18 |
| | | | 370/331 |
| 2014/0011534 A1 | 1/2014 | Dimou | |
| 2014/0057636 A1* | 2/2014 | Schemagin | H04W 36/326 |
| | | | 455/422.1 |
| 2014/0364125 A1* | 12/2014 | Fudaba | H04W 36/22 |
| | | | 455/438 |
| 2016/0165484 A1 | 6/2016 | Cui et al. | |

OTHER PUBLICATIONS

Giambene, et al., "Soft Frequency Reuse Schemes for Heterogeneous LTE Systems," ResearchGate, Jun. 2015 (7 pages, including a cover page).
Motorola Solutions Inc., "LXN 505 Ultra Portable LTE Solution," Motorola Solutions Data Sheet, May 2022, (4 pages).
Oueis, et al., "Overview of LTE Isolated E-Utran Operation for Public Safety," IEEE, Jun. 2017 (pp. 98-105).
International Search Report and Written Opinion for Related Application No. PCT/PL/2020/050073 dated Jun. 25, 2021 (15 pages).

* cited by examiner

MOBILITY AND COLLABORATION BETWEEN ULTRAPORTABLE SYSTEMS

BACKGROUND OF THE INVENTION

An ultraportable system is a 4G/5G core-system that is movable or portable and can be deployed relatively quickly at an incident area (for example, the cite of an emergency, a crime scene, or the like). Generally, ultraportable systems provide reliable and secure coverage for portable communications devices at incident areas.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
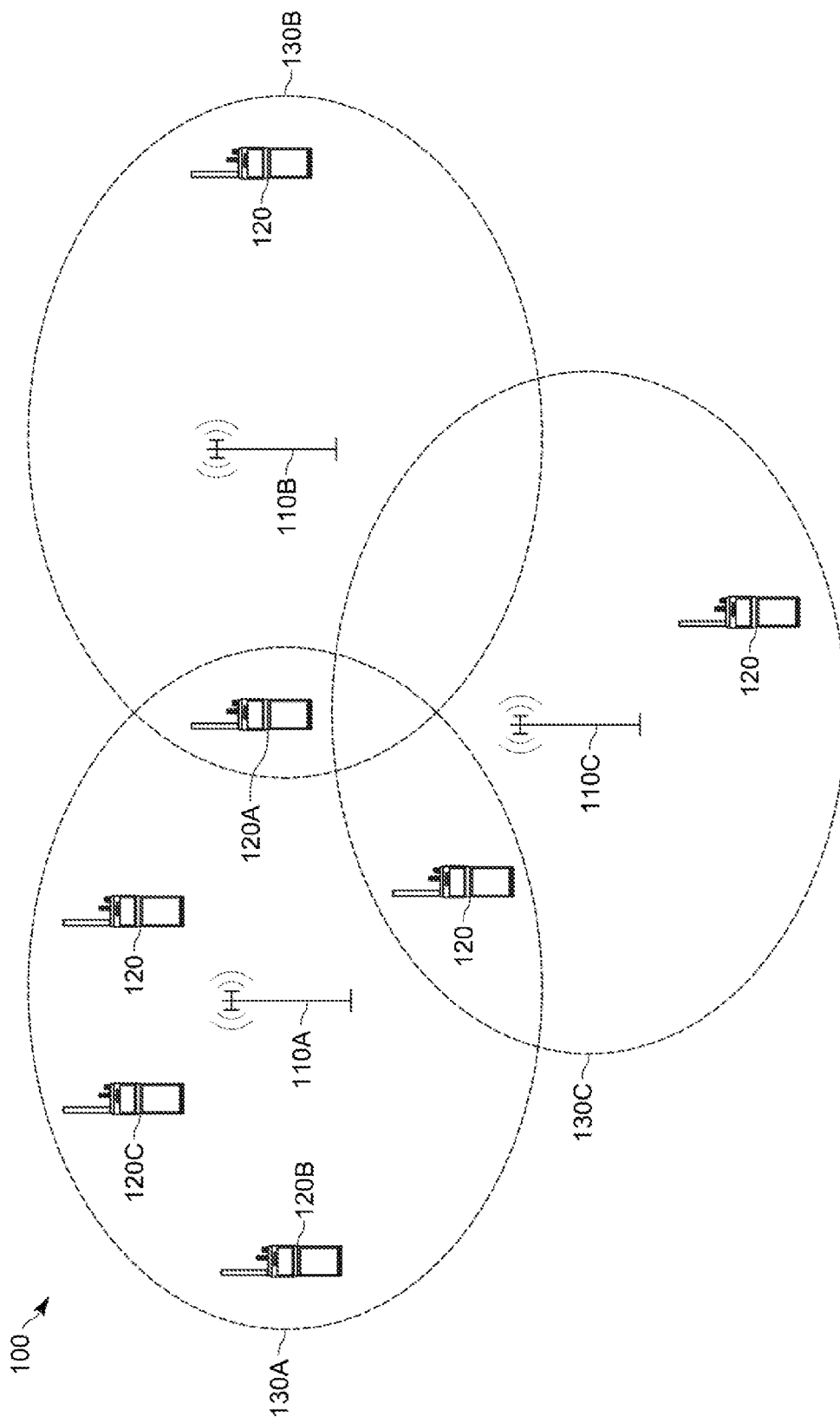
FIG. 1 illustrates an ultraportable communication system deployed at an incident area in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Ultraportable systems are limited in the number of portable communications devices that can connect to them. For example, one ultraportable base station may support between 50 to 100 portable communications devices. Some incidents may require more portable communications devices than supported by a single base station. An organization (for example, a police or fire department) may support these additional portable communications devices and increase coverage area by deploying additional ultraportable base stations at the incident area. In these situations, there is a need for handling portable communications devices switching between the different ultraportable base stations (that is, mobility and collaboration between the systems) deployed at the incident area to manage capacity limitations.

One embodiment provides a first base station for mobility and collaboration between ultraportable systems. The first base station includes a transceiver communicating with a plurality of portable communications devices and an electronic processor coupled to the transceiver. The electronic processor is configured to receive an indication from a first portable communications device of the plurality of portable communications devices that the first portable communications device is in a coverage area of a second base station. The second base station is in an enhanced packet core (EPC) group with the first base station and the second base station is not connected to the first base station using a X2/S1 satellite link. The electronic processor is also configured to determine a number of portable communications devices connected to the first base station and determine that the number of portable communications devices connected to the first base station exceeds a capacity threshold of the first base station. The electronic processor is further configured to instruct the first portable communications device to re-attach to the second base station in response to determining that the number of portable communications devices connected to the first base station exceeds the capacity threshold.

Another embodiment provides a method for mobility and collaboration between ultraportable systems. The method includes connecting a plurality of portable communications devices to a first base station and receiving, at the first base station, an indication from a first portable communications device of the plurality of portable communications devices that the first portable communications device is in a coverage area of a second base station. The second base station is in an enhanced packet core (EPC) group with the first base station and the second base station is not connected to the first base station using a X2/S1 satellite link. The method also includes determining, using the first base station, a number of portable communications devices connected to the first base station and determining, using the first base station, that the number of portable communications devices connected to the first base station exceeds a capacity threshold of the first base station. The method further includes instructing, using the first base station, the first portable communications device to re-attach to the second base station in response to determining that the number of portable communications devices connected to the first base station exceeds the capacity threshold.

Another embodiment provides a system for mobility and collaboration between ultraportable systems. The system includes a plurality of portable communications devices including a first portable communications device, a first base station having a public land mobile network (PLMN) code, and a second base station in a same enhanced packet core (EPC) group as the first base station and having the PLMN code. The second base station is not connected to the first base station using a X2/S1 satellite link. The first base station is configured to receive an indication from the first portable communications device that the first portable communications device is in a coverage area of the second base station and determine a number of portable communications devices connected to the first base station. The first base station is also configured to determine that the number of portable communications devices connected to the first base station exceeds a capacity threshold of the first base station and instruct the first portable communications device to re-attach to the second base station in response to determining that the number of portable communications devices connected to the first base station exceeds the capacity threshold.

FIG. 1 illustrates an example ultraportable communications system 100 deployed at an incident area. For example, a public safety organization may deploy the ultraportable communications system 100 at an emergency site to provide communication capabilities for members of the public safety organization. The ultraportable communications system 100 includes a plurality of base stations 110 providing communication coverage to a plurality of portable communications devices 120. The plurality of base stations 110 include a first base station 110A, a second base station 110B, and a third base station 110C, which are singularly referred to as a base station 110. The base station 110 is, for example, an ultraportable eNodeB. The first base station 110A, the second base station 110B, and the third base station 110C provide coverage to the plurality of portable communications devices 120 over a first coverage area 130A, a second coverage area 130B, and a third coverage area 130C respectively.

The plurality of portable communications devices 120 include at least a first portable communications device 120A, a second portable communications device 120B, and a third portable communications device 120C which are singularly referred to as a portable communications device 120. The portable communications device 120 is, for example, a mobile two-way radio, a portable two-way radio, a smart telephone, a tablet computer, a laptop computer, a smart wearable device, and the like.

When a portable communications device 120 is in a coverage area 130 of a base station 110, the portable communications device 120 attempts to connect to the base station 110. For example, when the first portable communications device 120A is in the first coverage area 130A, the first portable communications device 120A attempts to connect to the first base station 110A. The first portable communications device 120A connects to the first base station 110A using, for example, a $3^{rd}$ Generation Partnership Program (3GPP) attach procedure. The first portable communications device 120A initiates the attachment by sending an attach request to the first base station 110A. The first base station 110A authenticates the first portable communications device 120A in response to receiving the attach request. When the authentication is successful, the first base station 110A sends an attach acknowledgement to the first portable communications device 120A. The first portable communications device 120A can then communicate with other portable communications devices 120 attached to the first base station 110A over the first base station 110A.

Figure 2:
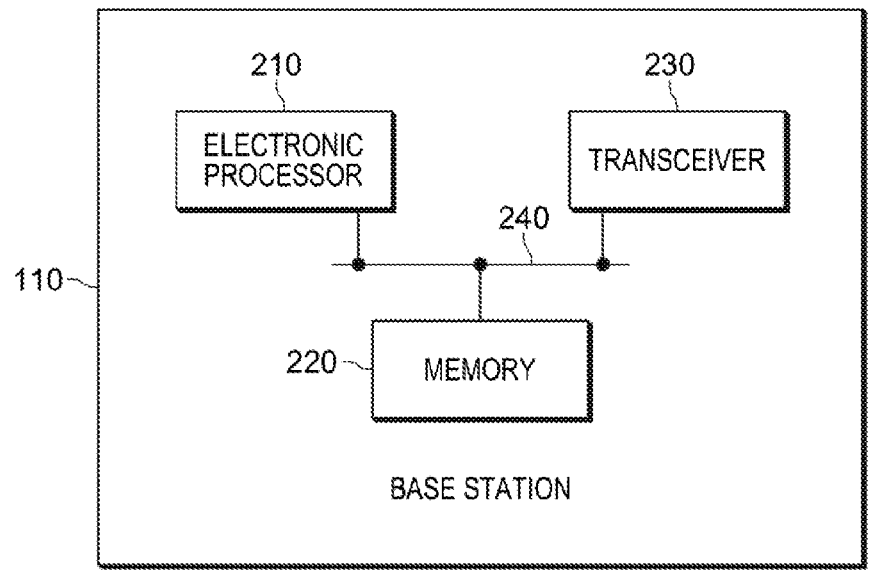
FIG. 2 illustrates a block diagram of a base station of the ultraportable communication system of FIG. 1 in accordance with some embodiments.

FIG. 2 is a block diagram of an example base station 110. In the example illustrated, the base station 110 includes an electronic processor 210, a memory 220, and a transceiver 230. The electronic processor 210, the memory 220, and the transceiver 230 communicate over one or more control and/or data buses (for example, a communication bus 240). FIG. 2 illustrates only one example embodiment of the base station 110. The base station 110 may include more or fewer components and may perform functions other than those explicitly described herein.

In some embodiments, the electronic processor 210 is implemented as a microprocessor with separate memory, for example, memory 220. In other embodiments the electronic processor 210 is implemented as a microcontroller or digital signal processor (with memory 220 on the same chip). In other embodiments, the electronic processor 210 is implemented using multiple electronic processors. In addition, the electronic processor 210 may be implemented partially or entirely as, for example, a field programmable gate array (FPGA), an application specific integrated circuit (ASIC), and the like and the memory 220 may not be needed or be modified accordingly. In the example illustrated, the memory 220 includes non-transitory, computer readable memory that stores instructions that are received and executed by the electronic processor 210 to carry out the functionality of the base station 110. The memory 220 may include, for example, a program storage area and a data storage area. The program storage area and the data storage area may include combinations of different types of memory, for example, read-only memory and random-access memory.

The transceiver 230 enables wireless communication between the base station 110 and the plurality of portable communications devices 120. In some embodiments, the transceiver 230 may include separate transmitting and receiving components, for example, a transmitter and a receiver.

Figure 3:
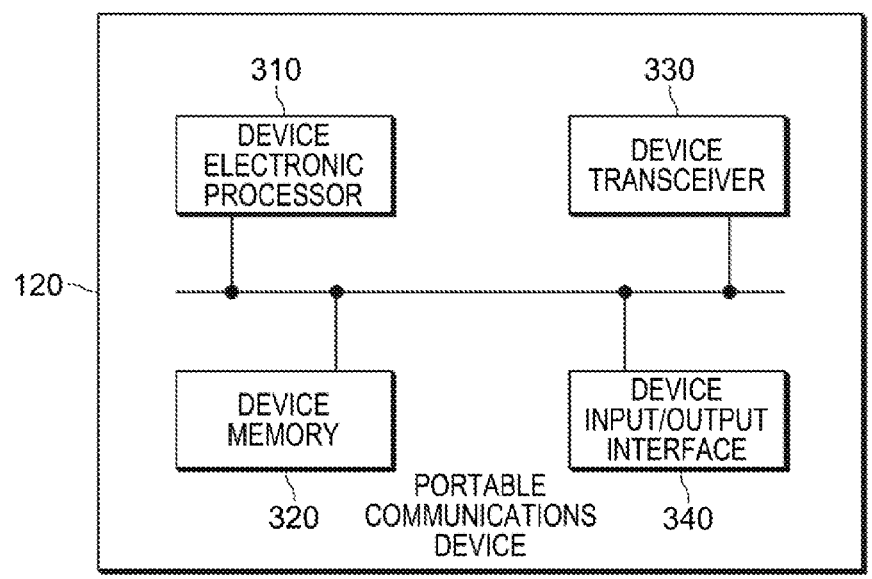
FIG. 3 illustrates a block diagram of a portable communications device of the ultraportable communication system of FIG. in accordance with some embodiments.

FIG. 3 is a block diagram of an example portable communications device 120. In the example illustrated, the portable communications device 120 includes a device electronic processor 310, a device memory 320, a device transceiver 330, and a device input/output interface 340. The device electronic processor 310, the device memory 320, the device transceiver 330, and the device input/output interface 340 communicate over one or more control and/or data buses (for example, a device communication bus 350). FIG. 3 illustrates only one example embodiment of the portable communications device 120. The portable communications device 120 may include more or fewer components and may perform functions other than those explicitly described herein.

The device electronic processor 310, the device memory 320, and the device transceiver 330 are implemented same as or similar to the electronic processor 210, the memory 220, and the transceiver 230. The device transceiver 330 enables wireless communication between the portable communications device 120 and other portable communications devices 120 over the base station 110. The device input/output interface 340 may include one or more input mechanisms (for example, a touch pad, a keypad, a microphone, and the like), one or more output mechanisms (for example, a display, a speaker, and the like), or a combination thereof, or a combined input and output mechanism such as a touch screen.

Referring to FIG. 1, the plurality of base stations 110 may be deployed by the same organization or partner organizations to provide communication coverage at an incident area. As a result, the plurality of base stations 110 are, for example, ultraportable long term evolution (LTE)/5G systems that are in the same enhanced packet core (EPC) group. That is, the first base station 110A is an ultraportable LTE/5G system in a same EPC group as the second base station 110B. The plurality of portable communications devices 120 are provisioned to be supported by all the base stations 110 of the same EPC group, that is, by the plurality of base stations 110. The plurality of base stations 110 share a public land mobile network (PLMN) code. However, the plurality of base stations 110 are not connected using a X2/S1 satellite link. That is, the second base station 110B is not connected to the first base station 110A using an X2/S1 satellite link.

Ultraportable systems have limited capacity to support portable communications devices 120 due to hardware and license limitations. Ultraportable systems are smaller in size compared to regular eNodeBs to maintain portability of the base stations 110. This reduced sized results in reduced hardware to support the portable communications devices 120. Additionally, the organization may have to purchase a separate license for each additional portable communications device 120 that can connect to the base station 110. When a base station 110 reaches capacity, the base station 110 may reject any new attachment requests from portable communications devices 120. For example, when the first base station 110A reaches capacity, the first base station 110A rejects an attachment request from the first portable communications device 120A. This is undesirable especially when the new portable communications device 120 is not in the coverage area 130 of another base station 110 at the incident area.

Capacity issues may be handled by transferring portable communications devices 120 that are in the coverage area 130 of the multiple base stations 110 from an over-capacity base station 110 to an under-capacity base station 110. One such solution for transferring portable communications devices 120 is roaming. However, roaming only works for base stations 110 having different PLMN codes. Another solution is to perform a handover. However, handover only works in a situation where the base stations 110 are connected using an X2/S1 satellite link. Neither roaming nor handover are currently helpful in mobility and collaboration between ultraportable systems having the same PLMN code and not connected by an X2/S1 satellite link.

Figure 4:
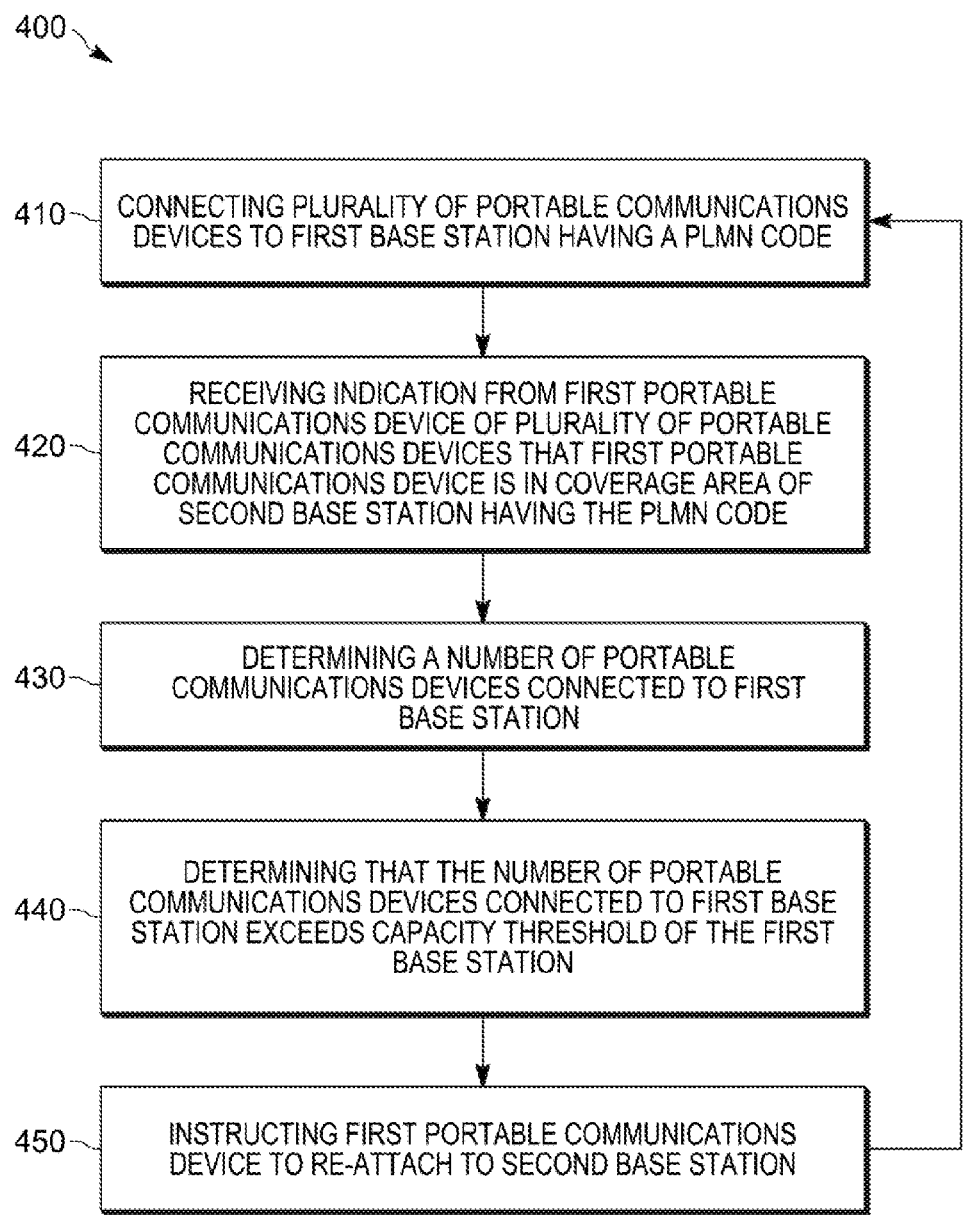
FIG. 4 is a flowchart of a method for mobility and collaboration between ultraportable systems of FIG. 1 in accordance with some embodiments.
Figure 5:
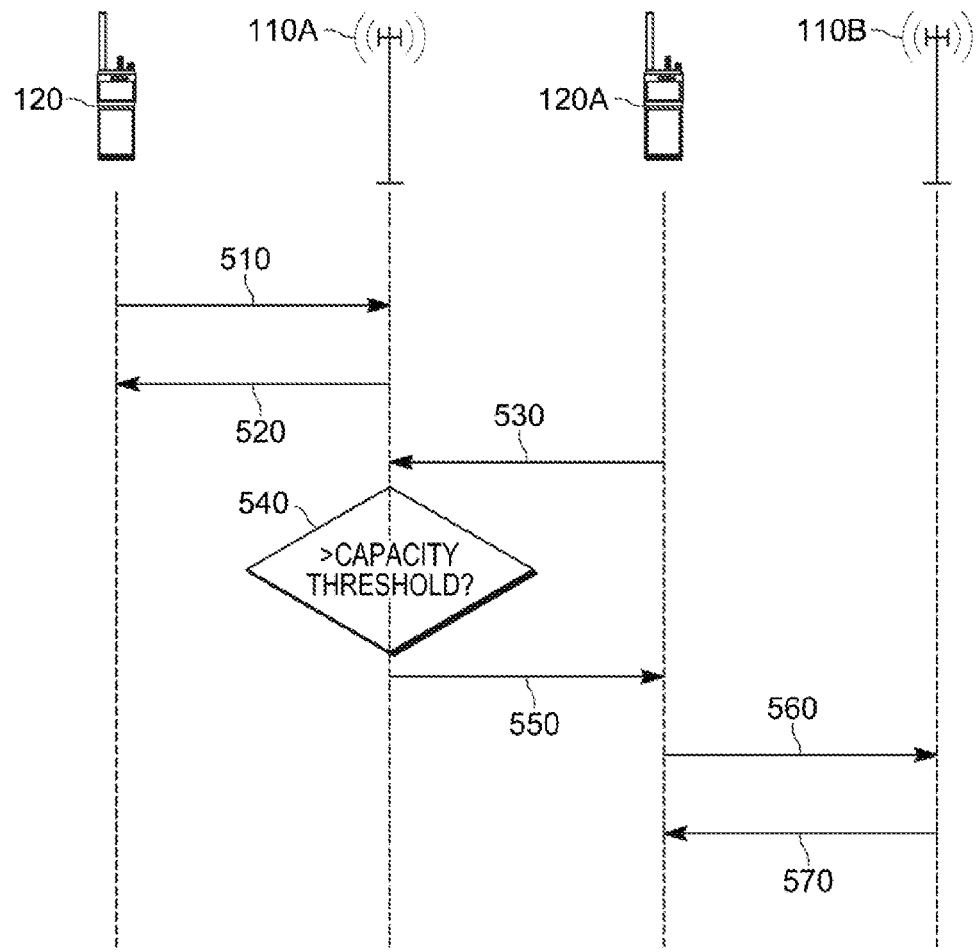
FIG. 5 is a message flow diagram of the communication between the base stations and portable communications devices of FIG. 1 in accordance with some embodiments.

FIG. 4 is a flowchart of an example method 400 for mobility and collaboration between ultraportable systems. The method 400 is further explained with reference to FIG. 5, which illustrates a message flow between the base stations 110 and the portable communications devices 120. The method 400 includes, connecting a plurality of portable communications devices 120 to the first base station 110A (at block 410). Each of the plurality of portable communications devices 120 sends an attach request to the first base station 110A. The first base station 110A connects to the plurality of portable communications devices 120 after authentication and sends an acknowledgement indicating that the plurality of portable communications devices 120 are connected to the first base station 110A. For example, as shown in FIG. 5, a portable communications device 120 sends an attach request 510 to the first base station 110A. After authenticating the portable communications device 120, the first base station 110A accepts the attach request and sends an acknowledgment 520 to the portable communications device 120.

The method 400 includes receiving, at the first base station 110A, an indication from a first portable communications device 120A of the plurality of portable communications devices 120 that the first portable communications device 120A is in the coverage area 130B of the second base station 110B (at block 420). The second base station 110B has the same PLMN code as the first base station 110A as both the first base station 110A and the second base station 110B are in the same EPC group. The second base station 110B is not connected to the first base station 110A using an X2/S1 satellite link. The portable communications devices 120 periodically determine signal strength of signals received from each base station 110 having the same PLMN code. Referring to FIG. 5, the first portable communications device 120A provides these signal strength measurements 530 periodically to the first base station 110A. Based on the signals from the first portable communications device 120A, the first base station 110A may determine that the first portable communications device 120A is also in the coverage area 130B of the second base station 110B.

The method 400 includes determining, using the first base station 110A, a number of portable communications devices 120 connected to the first base station 110A (at block 430). The first base station 110A may determine the number of portable communications devices 120 connected to the first base station 110A every time a new connection to a portable communications device 120 is established or a portable communications device 120 disconnects from the first base station 110A.

The method 400 also includes determining, using the first base station 110A, that the number of portable communications devices 120 connected to the first base station 110A exceeds a capacity threshold of the first base station 110A (at block 440). The capacity threshold for the first base station 110A may be set at a number below the maximum capacity of the first base station 110A. For example, when the maximum capacity of the first base station 110A is 100 portable communications devices 120, then the capacity threshold may be set to 95 portable communications devices 120. Referring to FIG. 5, the first base station 110A compares the number of portable communications devices 120 connected to the first base station 110A to the capacity threshold to determine whether the number exceeds the capacity threshold at decision 540.

The method 400 includes instructing, using the first base station 110A, the first portable communications device 120A to re-attach to the second base station 110B in response to determining that the number of portable communications devices 120 connected to the first base station 110A exceeds the capacity threshold (at block 450). Referring to FIG. 5, the first base station 110A provides a signal 550 to the first portable communications device 120A to detach from the first base station 110A and connect to the second base station 110B. The method 400 may repeat for each new connection of a portable communications device 120.

The first portable communications device 120A receives the instruction 550 to re-attach to the second base station 110B. In response to the instruction 550, the first portable communications device 120A disconnects from the first base station 110A. The first portable communications device 120A loses network connectivity when disconnected from the first base station 110A and before attaching to the second base station 110B. The first portable communications device 120A then sends an attach request 560 to the second base station 110B such that the first portable communications device 120A can re-attach to the second base station 110B. After authentication, the second base station 110B connects to the first portable communications device 120A and sends an acknowledgment 570 to the first portable communications device 120A. The first portable communications device 120A regains network connectivity in response to re-attaching to the second base station 110B. The re-attachment of the first portable communications device 120A is thereby performed without roaming or a handover procedure by the base stations 110. Rather, the re-attachment is performed by the first portable communications device 120A in response to receiving an instruction from the first base station 110A.

In some embodiments, the first base station 110A may determine that several portable communications devices 120 connected to the first base station 110A are in the coverage area 130B of the second base station 110B. For example, the first base station 110A may receive a second indication from a second portable communications device 120B of the plurality of portable communications devices 120 that the second portable communications device 120B is in the coverage area 130B of the second base station 110B. The first base station 110A may select between the first portable communications device 120A and the second portable communications device 120B for re-attachment to the second base station 110B. The first base station 110A may select the first portable communications device 120A between the first portable communications device 120A and the second portable communications device 120B based on one or more of user priority, probability of using a channel of the first base station 110A, location of a portable communications device 120, whether a user is after hours, and whether more than one user are in the same location. The users referred to are users of the first portable communications device 120A and the second portable communications device 120B.

Figure 6:
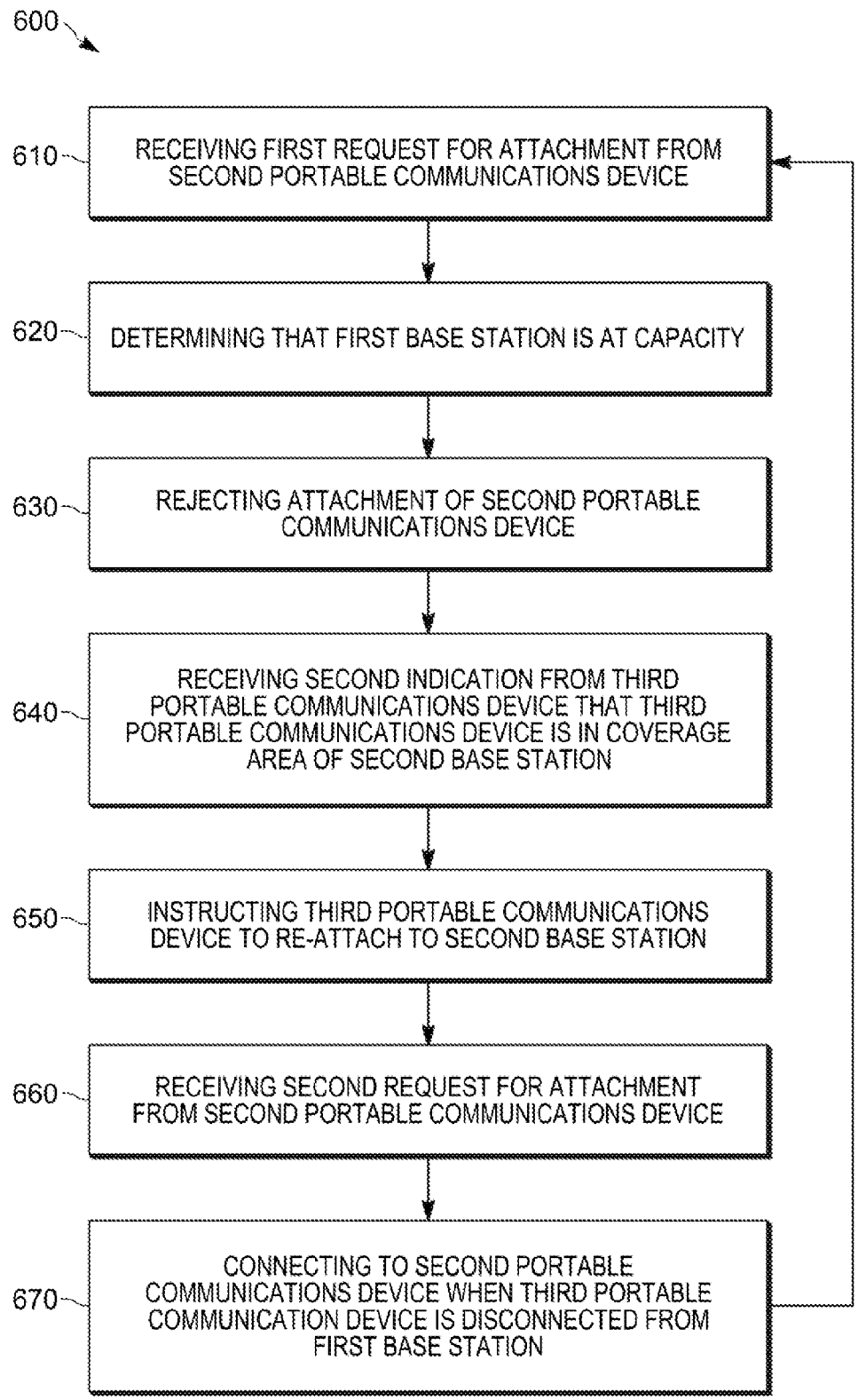
FIG. 6 is a flowchart of a method for mobility and collaboration between ultraportable systems of FIG. 1 in accordance with some embodiments.
Figure 7:
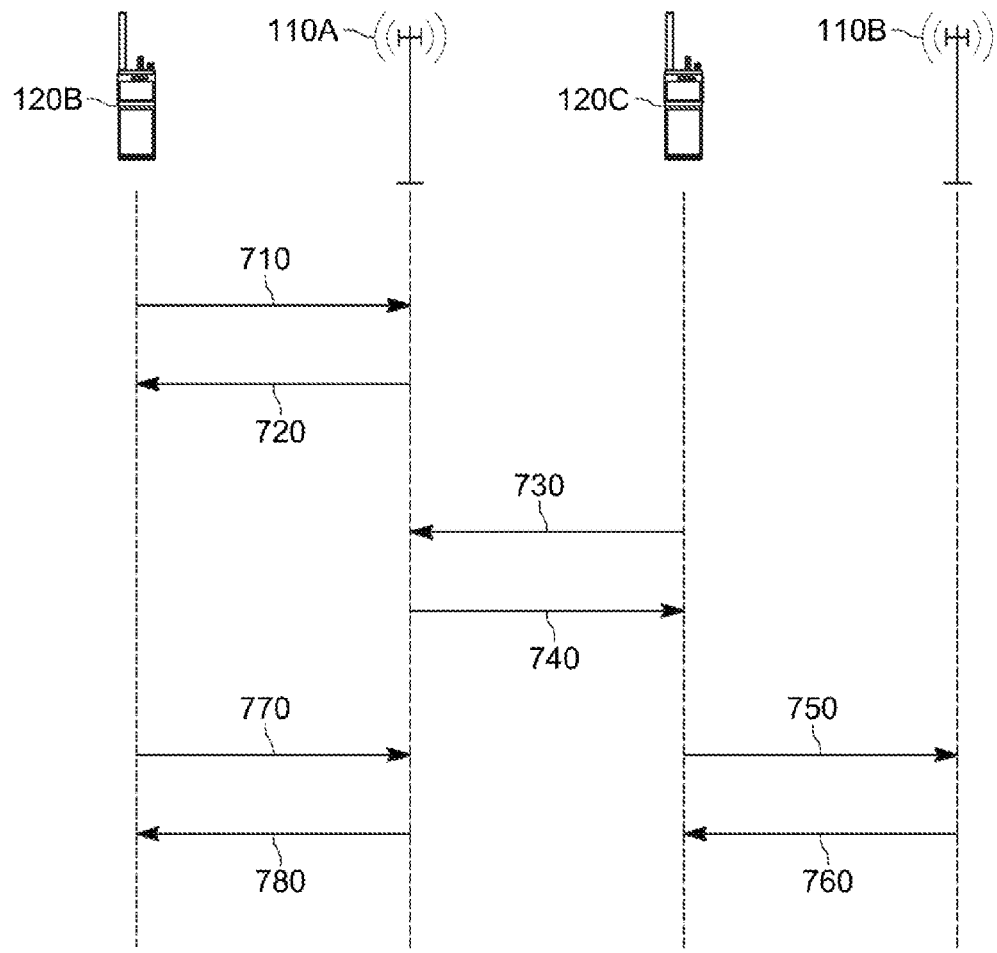
FIG. 7 is a message flow diagram of the communication between the base stations and portable communications devices of FIG. 1 in accordance with some embodiments.

FIG. 6 is a flowchart of another example method 600 for mobility and collaboration between ultraportable systems. The method 600 is further explained with reference to FIG. 7, which illustrates a flow diagram between the base stations 110 and the portable communications devices 120. The method 600 includes receiving, at the first base station 110A, a first request for attachment from the second portable communications device 120B not in the plurality of portable communications devices 120 connected to the first base station 110A (at block 610). Referring to FIG. 7, the second portable communications device 120B sends a first attach request 710 to the first base station 110A.

The method 600 includes determining, using the first base station 110A, that the first base station 110A is at capacity (at block 620). As discussed above, the first base station 110A monitors the number of portable communications devices 120 coupled to the first base station 110A and determines whether the number reaches the maximum capacity of the first base station 110A. In one example, the maximum capacity of the first base station 110A is 100 portable communications devices 120.

The method 600 includes rejecting, using the first base station 110A, attachment of the second portable communications device 120B (at block 630). Referring to FIG. 7, the first base station 110A sends a rejection signal 720 (for example, a negative acknowledgement nACK) to the second portable communications device 120B.

The method 600 includes receiving, at the first base station 110A, a second indication from a third portable communications device 120C of the plurality of portable communications devices 120 connected to the first base station 110A that the third portable communications device 120C is in the coverage area 130B of the second base station 110B (at block 640). Referring to FIG. 7, the third portable communications device 120C provides signal strength measurements 730 periodically to the first base station 110A. Based on the signals from the third portable communications device 120C, the first base station 110A may determine that the third portable communications device 120C is also in the coverage area 130B of the second base station 110B.

The method 600 includes instructing, using the first base station 110A, the third portable communications device 120C to re-attach to the second base station 110B (at block 650). Referring to FIG. 7, the first base station 110A provides a signal 740 to the third portable communications device 120C to detach from the first base station 110A and connect to the second base station 110B. The third portable communications device 120C receives the instruction 740 to re-attach to the second base station 110B. In response to the instruction 740, the third portable communications device 120C disconnects from the first base station 110A. The third portable communications device 120C then sends an attach request 750 to the second base station 110B such that the third portable communications device 120C can re-attach to the second base station 110B. After authentication, the second base station 110B connects to the third portable communications device 120C and sends an acknowledgment 760 to the third portable communications device 120C.

The method 600 includes receiving, at the first base station 110A, a second request for attachment from the second portable communications device 120B (at block 660). Referring to FIG. 7, the second portable communications device 120B sends a second attach request 770 to the first base station 110A.

The method 600 includes connecting, using the first base station 110A, to the second portable communications device 120B when the third portable communications device 120C is disconnected from the first base station 110A (at block 660). After authenticating the third portable communications device 120C, the first base station 110A accepts the attach request and sends an acknowledgment 780 to the third portable communications device 120C. The method 600 may repeat for each new connection request from a portable communications device 120.

In some embodiments, the aspects of the methods 400 and 600 can be combined. For example, the base station 110A allows additional portable communications device 120 connections even when the number of portable communications devices 120 connected to the base station 110 exceed the threshold but are still below capacity. Specifically, the first base station 110 may allow the threshold to be exceeded when the first base station 110 does not anticipate receiving additional attach requests over the first base station's 110 capacity. In some embodiments, the first base station 110A may automatically instruct portable communications devices 120 to re-attach to the second base station 110B even when the number of portable communications devices 120 connected to the first base station 110A does not exceed the threshold. Specifically, the first base station 110A may instruct re-attachment when the first base station 110A anticipates additional attach requests from portable communications devices 120 that are not in the coverage area 130B of the second base station 110B.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions.

The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A first base station for mobility and collaboration between ultraportable systems, the first base station comprising:
   a transceiver communicating with a plurality of portable communications devices; and
   an electronic processor coupled to the transceiver and configured to
      receive an indication from a first portable communications device of the plurality of portable communications devices that the first portable communications device is in a coverage area of a second base station, wherein the second base station is in an enhanced packet core (EPC) group with the first base station and the second base station is not connected to the first base station using a X2/S1 satellite link,
      determine a number of portable communications devices connected to the first base station,
      determine that the number of portable communications devices connected to the first base station exceeds a capacity threshold of the first base station,
      instruct the first portable communications device to re-attach to the second base station in response to determining that the number of portable communications devices connected to the first base station exceeds the capacity threshold
      receive a first request for attachment from a second portable communications device not in the plurality of portable communications devices,
      determine that the first base station is at capacity,
      reject attachment of the second portable communications device,
      receive a second indication from a third portable communications device of the plurality of portable communications devices that the third portable communications device is in the coverage area of the second base station,
      instruct the third portable communications device to re-attach to the second base station,
      receive a second request for attachment from the second portable communications device, and
      connect to the second portable communications device when the third portable communications device is disconnected from the first base station.

2. The first base station of claim 1, wherein the first portable communications device disconnects with the first base station before re-attaching to the second base station, wherein the first portable communications device loses network connectivity when disconnected with the first base station.

3. The first base station of claim 1, wherein the electronic processor is further configured to
   receive a third indication from a fourth portable communications device of the plurality of portable communications devices that the fourth portable communications device is in the coverage area of the second base station; and
   select the first portable communications device between the first portable communications device and the fourth portable communications device for re-attachment based on one or more selected from the group consisting of user priority, probability of using a channel of the first base station, location of a portable communications device, whether a user is after hours, and whether more than one user are in the same location.

4. The first base station of claim 1, wherein the first base station and the second base station are ultraportable long term evolution (LTE)/5G systems.

5. The first base station of claim 4, wherein the plurality of portable communications devices is provisioned to be supported by all base stations of the same EPC group.

6. A method for mobility and collaboration between ultraportable systems, the method comprising:
    connecting a plurality of portable communications devices to a first base station;
    receiving, at the first base station, an indication from a first portable communications device of the plurality of portable communications devices that the first portable communications device is in a coverage area of a second base station, wherein the second base station is in an enhanced packet core (EPC) group with the first base station and the second base station is not connected to the first base station using a X2/S1 satellite link;
    determining, using the first base station, a number of portable communications devices connected to the first base station;
    determining, using the first base station, that the number of portable communications devices connected to the first base station exceeds a capacity threshold of the first base station;
    instructing, using the first base station, the first portable communications device to re-attach to the second base station in response to determining that the number of portable communications devices connected to the first base station exceeds the capacity threshold;
    receiving, at the first base station, a first request for attachment from a second portable communications device not in the plurality of portable communications devices;
    determining, using the first base station, that the first base station is at capacity;
    rejecting, using the first base station, attachment of the second portable communications device;
    receiving, at the first base station, a second indication from a third portable communications device of the plurality of portable communications devices that the third portable communications device is in the coverage area of the second base station;
    instructing, using the first base station, the third portable communications device to re-attach to the second base station;
    receiving, at the first base station, a second request for attachment from the second portable communications device; and
    connecting, using the first base station, to the second portable communications device when the third portable communications device is disconnected from the first base station.

7. The method of claim 6, further comprising:
    receiving, at the first portable communications device, the instruction to re-attach to the second base station;
    disconnecting the first portable communications device from the first base station; and
    re-attaching the first portable communications device to the second base station.

8. The method of claim 6, further comprising:
    receiving, at the first base station, a third indication from a fourth portable communications device of the plurality of portable communications devices that the fourth portable communications device is in the coverage area of the second base station; and
    selecting, at the first base station, the first portable communications device between the first portable communications device and the fourth portable communications device for re-attachment based on one or more selected from the group consisting of user priority, probability of using a channel of the first base station, location of a portable communications device, whether a user is after hours, and whether more than one user are in the same location.

9. The method of claim 6, wherein the first base station and the second base station are ultraportable long term evolution (LTE)/5G systems.

10. The method of claim 9, wherein the plurality of portable communications devices is provisioned to be supported by all base stations of the same EPC group.

11. A system for mobility and collaboration between ultraportable systems, the system comprising:
    a plurality of portable communications devices including a first portable communications device;
    a first base station having a public land mobile network (PLMN) code; and
    a second base station in a same enhanced packet core (EPC) group as the first base station and having the PLMN code, wherein the second base station is not connected to the first base station using a X2/S1 satellite link,
    wherein the first base station is configured to
        receive an indication from the first portable communications device that the first portable communications device is in a coverage area of the second base station,
        determine a number of portable communications devices connected to the first base station,
        determine that the number of portable communications devices connected to the first base station exceeds a capacity threshold of the first base station,
        instruct the first portable communications device to re-attach to the second base station in response to determining that the number of portable communications devices connected to the first base station exceeds the capacity threshold.

12. The system of claim 11, wherein the first portable communications device is configured to:
    receive the instruction to re-attach to the second base station;
    disconnect from the first base station; and
    re-attach to the second base station.

13. The system of claim 12, wherein the first portable communications device loses network connectivity when disconnected with the first base station.

14. The system of claim 11, wherein the first base station is further configured to
    receive a second indication from a second portable communications device of the plurality of portable communications devices that the second portable communications device is in the coverage area of the second base station; and
    select the first portable communications device between the first portable communications device and the second portable communications device for re-attachment based on one or more selected from the group consisting of: user priority, probability of using a channel of the first base station, location of a portable communications device, whether a user is after hours, and whether more than one user are in the same location.

15. The system of claim 11, wherein the first base station is further configured to
receive a first request for attachment from a second portable communications device not included in the plurality of portable communications devices;
determine that the first base station is at capacity;
reject attachment of the second portable communications device;
receive a second indication from a third portable communications device included in the plurality of portable communications devices that the third portable communications device is in the coverage area of the second base station;
instruct the third portable communications device to re-attach to the second base station;
receive a second request for attachment from the second portable communications device; and
connect to the second portable communications device when the third portable communications device is disconnected from the first base station.

16. The system of claim 11, wherein the first base station and the second base station are ultraportable long term evolution (LTE)/5G systems.

17. The system of claim 11, wherein the plurality of portable communications devices is provisioned to be supported by all base stations of the same EPC group.

* * * * *